United States Patent [19]
Ahlinder

[11] Patent Number: 6,033,444
[45] Date of Patent: Mar. 7, 2000

[54] SHADING OF PAPER

[75] Inventor: Bertil Ahlinder, Jönköping, Sweden

[73] Assignee: Stora Kopparbergs Bergslags AB, Falun, Sweden

[21] Appl. No.: 09/165,797

[22] Filed: Oct. 2, 1998

[30] Foreign Application Priority Data

Oct. 9, 1997 [SE] Sweden .................................. 9703667

[51] Int. Cl.$^7$ ............................ C09B 67/22; D21F 11/00; D21H 11/00
[52] U.S. Cl. .......................... 8/637.1; 162/126; 162/162; 106/495; 8/919; 8/102
[58] Field of Search ........................... 8/102, 919, 637.1; 106/495, 497; 162/126, 162

[56] References Cited

U.S. PATENT DOCUMENTS

| | | |
|---|---|---|
| 2,844,485 | 7/1958 | Struve . |
| 3,041,200 | 6/1962 | Steffen . |
| 3,074,950 | 1/1963 | Deuschel et al. . |
| 3,836,379 | 9/1974 | Kirsch et al. . |
| 4,451,398 | 5/1984 | Patsch et al. . |
| 5,131,981 | 7/1992 | Hahn et al. . |
| 5,883,233 | 3/1999 | Catlin et al. . |

FOREIGN PATENT DOCUMENTS

| | | |
|---|---|---|
| 0 087 713 | 9/1983 | European Pat. Off. . |
| 0 735 109 | 10/1996 | European Pat. Off. . |

OTHER PUBLICATIONS

*Pigment Handbook* "Quincridone Pigments" F. Frederick Ehrich p 601, 605, 607, 1988.
*Pigment Handbook* "Phthalocyanine Blue Pigments" Hugh M. Smith p 663, 673, 1988.
"Colorants for Polymers", U.S. Food & Drug Administration, CAPLUS AB 1991: 65411.
Katayose et al "Aqueous Processed Pigments". Ab of JP 5071526 Jun. 1977.
Katajima, "Water–Based Gravure Printing Inks Containing Epoxy Compound" Ab of JP 07242850 Sep. 1995.

*Primary Examiner*—Margaret Einsmann
*Attorney, Agent, or Firm*—Nixon & Vanderhye P.C.

[57] ABSTRACT

A method and a color mixture for shading paper, and a shaded paper that comprises or consists of one or more layers made of the same or different pulps, which paper is intended to be used in connection with foodstuffs. The pulp or paper layer is treated with a color mixture of at least two optically cooperating pigments that are approved for foodstuffs, one of which is quinacridone red with the FDA registration details C.I. pigment violet 19, C.I. No. 73900 (Code of Federal Regulations, Food and Drugs, Title 21, Part 170–199), and constituting the primary component of the color mixture, in order to obtain a shaded paper with a value for the color coordinate b* that is between 0 and 3. The primary component may comprise between about 75–85 per cent of the color mixture with the rest at least one blue pigment, such as phthalocyanine blue.

21 Claims, No Drawings

SHADING OF PAPER

BACKGROUND AND SUMMARY OF THE INVENTION

The present invention relates to a method of shading paper that comprises or consists of one or more layers made of the same or different pulps, which paper is intended to be used in connection with foodstuffs.

The invention also relates to a color mixture for shading paper that consists of one or more layers made of the same or different pulps, which paper is intended to be used in connection with foodstuffs, and a shaded paper produced by the method, using the color mixture.

So as to obtain the desired optical properties in paper products, the paper industry has used "shading colors". However, it has not been possible to use the shaded paper products in a satisfactory way for packaging in the foodstuffs industry, as many of the colors used are not approved by the U.S. Food and Drug Administration, the FDA. It has therefore not been possible to use the desired combinations of colors. In particular, a violet color approved by the FDA has been lacking.

The coloring of paper differs considerably from the shading of paper since with coloring the intention is for the product to acquire the same color as the pigment or pigment mixture, whereas with shading the intention is to reduce the natural yellow hue of the paper and the goal is to obtain an uncolored final product. How uncolored the final product becomes is measured by its whiteness and can be expressed by values for the color coordinate b*. A more uncolored product has greater whiteness than a product in which some nuance of color can be detected. Shading can thus be defined as "decoloring". Natively paper has a yellow color that is caused by inter alia residual lignin. Lignin is a natural constituent in paper products. When shading paper, a special color mixture of predetermined composition is added to reduce the reflection of green light and red light in the paper and thereby obtain a whiter product. Many dyestuffs have considerable light absorbency in blue light and this makes them unusable for increasing the whiteness of the paper.

A purpose of the invention is to provide a method, and a color mixture for shading paper products which enables the paper products shaded as desired to be used in the foodstuffs industry also, for packaging foodstuffs, and a shaded paper for such use.

Following extensive investigations it has been shown, surprisingly, that using the FDA-approved violet color quinacridone red as a main component, typically in a quantity of 50 per cent or more and particularly between about 75–85% (e.g. about 80%), in a color mixture that contains at least one further FDA-approved color for optical cooperation with the primary component, results in paper products that, when shaded with such a color mixture, display enhanced whiteness compared with the unshaded paper product.

According to the invention the method is characterized in that a pulp or layer, and more pulps or layers respectively, are treated with a color mixture of at least two optically cooperating dyestuffs that are approved for foodstuffs, one of which is quinacridone red with the FDA registration data C.I. pigment violet 19, C.I. No. 73900 (Code of Federal Regulations, Food and Drugs, Title 21, Part 170–199), and constituting the primary component in the color mixture, in order to obtain a shaded paper with a value for the color coordinate b* that is between 0 and 3, or any narrower range within that broad range (e.g. between about 0.2 and 1.5).

According to the invention the color mixture is characterized in that it contains at least two optically cooperating dyestuffs that are approved for foodstuffs, one of which is quinacridone red with the FDA registration data C.I. pigment violet 19, C.I. No. 73900 (Code of Federal Regulations, Food and Drugs, Title 21, Part 170–199), and constituting the primary component in the color mixture, which produces a shaded paper with a value for the color coordinate b* that is between 0 and 3.

According to a currently most preferred embodiment of the invention the treatment is carried out with a color mixture containing the above violet quinacridone red and phthalocyanine blue with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199).

The term "paper" also refers to cardboard. Examples of pulps that can be used are CTMP (Chemical Thermo Mechanical Pulp), and chemical pulps, such as kraft pulp. When used in a packaging material for foodstuffs, the paper may be coated with a barrier of polythene, for instance, but in many cases it can be used without such a barrier so that the foodstuff, which may be solid or liquid, comes into direct contact with the shaded paper.

According to one aspect of the present invention, a method of shading paper for use in connection with foodstuffs, and having at least one layer of pulp, is provided comprising: (a) Treating the at least one layer, or the pulp before formed into the paper layer, with a color mixture of at least two optically cooperating pigments that are approved for foodstuffs, the primary component of the color mixture comprising quinacridone red with the FDA registration data C.I. pigment violet 19, C.I. No. 73900 (Code of Federal Regulations, Food and Drugs, Title 21, Part 170–199), so as to obtain a shaded paper with a value for the color coordinate b* that is between 0 and 3. Preferably (a) is practiced using a color mixture in which the primary component comprises more than 50 per cent of the color mixture, preferably between about 75–85 per cent, and most preferably about 80 per cent. Also preferably (a) is practiced using a color mixture, calculated on pigment content, with a dosage of between about 10–500 (preferably between about 30–300) grams per ton of paper or pulp.

In the preferred embodiment (a) is carried out with a color mixture that also contains at least one blue pigment approved for foodstuffs, such as a mixture consisting essentially of the primary component and at least one blue pigment. The preferred blue pigment is phthalocyanine blue with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199).

In effecting the invention, (a) may be practiced by adding the color mixture to the pulp prior to formation of the paper layer, and the color mixture may be added to two or more different pulps, or two different batches of the same pulp which is made into multiple layers. A preferred pulp is CTMP.

The method may further comprise (b) providing a barrier coating on the shaded paper, and bringing the barrier coating into contact with solid or liquid foodstuffs. Alternatively the method may further comprise (c) bringing the shaded paper directly into contact with solid or liquid foodstuffs, e.g. by packaging the foodstuff with the paper.

According to another aspect of the present invention a shaded paper having at least one layer, and for use in connection with foodstuffs is provided. The at least one layer is colored with a color mixture of at least two optically cooperating pigments that are approved for foodstuffs, the primary component of the color mixture comprising quinacridone red with the FDA registration data C.I. pigment violet 19, C.I. No. 73900 (Code of Federal Regulations, Food and Drugs, Title 21, Part 170–199), so as to obtain a shaded paper with a value for the color coordinate b* that is between 0 and 3. The details of the color mixture in the paper, including the percentage of the color mixture that the primary component comprises, the dosage, and other preferred dyes, are as described above.

According to yet another aspect of the present invention a color mixture per se is provided comprising or consisting essentially of at least two optically cooperating pigments that are approved for foodstuffs, the primary component of the color mixture comprising quinacridone red with the FDA registration data C.I. pigment violet 19, C.I. No. 73900 (Code of Federal Regulations, Food and Drugs, Title 21, Part 170–199), capable of obtaining, when applied to a paper layer or pulp, shaded paper with a value for the color coordinate b* that is between 0 and 3. The details of the pigments, the percentage of the primary component, and the like, also may be as provided above.

It is the primary object of the present invention to effectively produce shaded paper for use in connection with foodstuffs, including direct contact therewith, with a value for the color coordinate b* that is between zero and 3 (or a narrower range within that broad range). This and other objects of the invention will become clear from an inspection of the detailed description which follows, and the appended claims.

DETAILED DESCRIPTION

The invention is further illustrated by the following examples, which are not intended to limit the scope of the claimed invention.

EXAMPLE 1

A color mixture consisting essentially of about 80 per cent of a violet component, the active pigment of which is quinacridone red (C.I. pigment violet 19) and about 20 per cent of a blue component, the active pigment of which is phthalocyanine blue (C.I. pigment blue 15) was added in three different dosages to bleached long-fiber sulphate pulp for the manufacture of a kraft paper of type MGN 30, where MGN stands for machine-glazed normal (kraft paper from Stora Gruvön, Sweden). For comparison, one run was carried out without such pigment additive. When the additives were used the color coordinates L*, a* and b* were changed as shown in Table 1. L*, a * and b* are defined in accordance with SCAN P72.95 (Scandinavian pulp, paper and board).

TABLE 1

| Pigment additive | L* | a* | b* | Whiteness | Tint |
|---|---|---|---|---|---|
| 0.-test | 95.3 - | 0.3 | 5.4 | 63.8 | -1.6 |
| 120 g/ton | 92.0 - | 0.4 | 1.4 | 74.4 | 0.11 |
| 156 g/ton | 91.4 - | 0.2 | 0.5 | 77.0 | 0.2 |
| 180 g/ton | 91.1 - | 0.3 | 0.4 | 77.0 | 0.3 |

The results of the test runs were very promising. The reduction of the color coordinate b* from 5.4 to 0.4 resulted in a paper with higher whiteness. Supplementary bleeding tests, required for BGVV approval, showed good hardiness 5, where BGVV stands for "Bundesinstitutes für Gesundheitlichen Verbraucherschutz und Veterinarmedicin".

EXAMPLE 2

The same color mixture as in Example 1 was added in different dosages to pulps for the manufacture of a paper of type "white top liner", WTL. For reference, a color mixture was used consisting of about 70 per cent Pergasol violet and about 30 per cent Pergasol tuerkis from Ciba-Geigy, which are not approved by the FDA for use in connection with foodstuffs. The results are shown below in Table 2.

TABLE 2

| Pigment additive* | L* | a* | b* | Whiteness |
|---|---|---|---|---|
| 40 g/ton not FDA approved | 91.0 | 0.0 | 2.2 | 68.2 |
| 137 g/ton FDA approved | 91.2 | 0.0 | 2.6 | 66.6 |
| 145 g/ton FDA approved | 91.2 | 0.0 | 2.4 | 67.9 |

The results show that corresponding optical properties are achieved with the shading color approved by the FDA in accordance with the invention as with the previously used shading color not approved by the FDA.

EXAMPLE 3

This example relates to the manufacture of a shaded cardboard with the designation Duplex 230mN, consisting of three layers, the surface layer of which consists of bleached chemical pulp, the center layer of CTMP, i.e. Chemical Thermo Mechanical Pulp, and chemical pulp, and the bottom layer of unbleached chemical pulp. In the test different color mixtures were used in the different layers so as to produce the correct tint in the finished product. The color mixture which produced the correct tint had the composition mentioned in Example 1. For reference, no pigment additive was used. The dosage of the said color mixture which produced the correct tint for the various layers when determined, is shown in Table 3 below.

TABLE 3

| Center layer (80/20) g/ton | Surface layer (80/20) g/ton |
|---|---|
| 300 | 310 |

The results achieved are shown in Table 4 below.

TABLE 4

| Cardboard | L* | a* | b* |
|---|---|---|---|
| Unshaded | 91.2 | 0.73 | 4.6 |
| Shaded | 88.9 | 0.35 | 1.6 |

The results show that the color approved by the FDA for foodstuffs can also be used for shading of multi-layers products.

The shading can be performed in the bottom layer, the center layer and the surface layer by adding a color mixture in accordance with the invention to the pulp before paper layer formation, or by coating formed paper webs.

The precise composition and dosage of the color mixture in accordance with the invention is determined by the tint of the unshaded product and the tint the customer desires for the product.

The invention is not limited to the color mixture described above as regards the choice of blue dyestuff. Blue dyestuffs other than the defined phthalocyanine blue (C.I. pigment blue 15) may be used if it or they are approved for foodstuffs and, in combination with the violet primary component, reduce the native yellow hue so that an uncolored paper is obtained with a value of the color coordinate b* between 0 and 3, or any narrower range within that broad range (e.g. between 0.1–2).

It will thus be seen that according to the present invention a highly advantageous method of shading paper, the shaded paper produced by the method, and a color mixture for practicing the method and producing the paper, have been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods, products, and mixtures.

What is claimed is:

1. A method of shading paper for use in connection with foodstuffs, and having at least one layer of pulp, comprising:
   (a) treating the at least one layer, or the pulp before formed into the paper layer, with a color mixture of at least two pigments that are approved for foodstuffs comprising a phthalocyanine blue pigment and a quinacridone red pigment the primary component of the color mixture comprising more than 50 percent of the color mixture, and comprising quinacridone red with the FDA registration data C.I. pigment violet 19, C.I. No. 73900 (Code of Federal Regulations, Food and Drugs, Title 21, Part 170–199), so as to obtain a shaded paper with a value for the color coordinate b* that is between 0 and 3, suitable for use with foodstuffs.

2. A method as recited in claim 1 wherein (a) is practiced using a color mixture in which the primary component comprises between about 75–85 per cent of the color mixture.

3. A method as recited in claim 1 wherein (a) is practiced by using a color mixture, calculated based on pigment content, at a dosage of between 10–500 grams per ton of paper or pulp.

4. A method as recited in claim 1 wherein (a) is practiced by using a color mixture, calculated based on pigment content, at a dosage of between 30–300 grams per ton of paper or pulp.

5. A method as recited in claim 1 wherein (a) is practiced using as the phthalocyanine blue pigment with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199).

6. A method as recited in claim 1 wherein (a) is practiced by adding the color mixture to CTMP before it is formed into the at least one layer.

7. A method as recited in claim 1 wherein (a) is practiced to provide a paper having at least two layers of the same or different pulps, each layer or pulp treated with the color mixture.

8. A method as recited in claim 5 wherein (a) is practiced so that the color mixture consists essentially of quinacridone red and pthalocyanine blue.

9. A method as recited in claim 1 further comprising (b) providing a barrier coating on the shaded paper, and bringing the barrier coating into contact with solid or liquid foodstuffs.

10. A method as recited in claim 1 further comprising (b) bringing the shaded paper directly into contact with solid or liquid foodstuffs.

11. A method as recited in claim 1 wherein (a) is practiced utilizing a color mixture consisting essentially of the primary component and phthalocyanine blue.

12. A shaded paper having at least one layer, and for use in connection with foodstuffs, said at least one layer colored with a color mixture of at least two pigments that are approved for foodstuffs comprising a phthalocyanine blue pigment and a quinacridone red pigment, the primary component of the color mixture comprising more than 50 percent of the color mixture, and comprising quinacridone red with the FDA registration data C.I. pigment violet 19, C.I. No. 73900 (Code of Federal Regulations, Food and Drugs, Title 21, Part 170–199), so that the shaded paper has a value for the color coordinate b* that is between 0 and 3, suitable for use with foodstuffs.

13. A shaded paper as recited in claim 12 wherein said primary component comprises between about 75–85 per cent of the color mixture.

14. A shaded paper as recited in claim 12 wherein said color mixture, calculated on pigment content, is provided in said paper as a dosage of between about 10–500 grams per ton of paper.

15. A shaded paper as recited in claim 12 wherein the color coordinate b* is between 0.1–2.

16. A shaded paper as recited in claim 13 wherein said color mixture consists essentially of said primary component and phthalocyanine blue with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199); and wherein said color mixture, calculated on pigment content, is provided in said paper as a dosage of between about 10–500 grams per ton of paper.

17. A shaded paper as recited in claim 12 wherein said color mixture consists essentially of said primary component and phthalocyanine blue with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199).

18. A color mixture for use in shading paper intended to be used in connection with foodstuffs, said mixture comprising: at least two pigments that are approved for foodstuffs comprising a phthalocyanine blue pigment and a quinacridone red pigment, the primary component of the color mixture comprising more than 50 percent of the color mixture, and comprising quinacridone red with the FDA registration data C.I. pigment violet 19, C.I. No. 73900 (Code of Federal Regulations, Food and Drugs, Title 21, Part 170–199), capable of obtaining, when applied to a paper layer or pulp, shaded paper with a value for the color coordinate b* that is between 0 and 3, suitable for use with foodstuffs.

19. A color mixture as recited in claim 18 consisting essentially of said primary component and said phathalocyanine blue pigment wherein said at least two optically cooperating pigments include said primary component and at least one blue pigment approved for foodstuffs.

20. A color mixture as recited in claim 18 consisting essentially said primary component and phthalocyanine blue with the FDA registration data C.I. pigment blue 15, 15:1, 15:2, 15:3 and 15:4, C.I. No. 74160, CAS Reg. No. 147-14-8 (Code of Federal Regulations, Food and Drugs, Title 21, Part 170–199).

21. A color mixture as recited in claim 18 wherein said primary component constitutes between about 75–85 per cent of said color mixture.

\* \* \* \* \*